(12) United States Patent
Koeppe et al.

(10) Patent No.: US 7,746,588 B2
(45) Date of Patent: Jun. 29, 2010

(54) TAPE-BASED DATA STORAGE SYSTEM CAPABLE OF READING AND/OR WRITING MULTIPLE ERROR CORRECTABLE SETS OF DATA

(75) Inventors: Peter VanderSalm Koeppe, San Diego, CA (US); Johnny Lynn Teale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/855,910

(22) Filed: Sep. 14, 2007

(65) Prior Publication Data

US 2009/0073609 A1 Mar. 19, 2009

(51) Int. Cl.
*G11B 5/09* (2006.01)
(52) U.S. Cl. .......................................... 360/48; 360/53
(58) Field of Classification Search ........................ None
See application file for complete search history.

(56) References Cited

U.S. PATENT DOCUMENTS

| | | | |
|---|---|---|---|
| 4,539,605 A * | 9/1985 | Hoshino et al. ............... 360/32 |
| 5,386,324 A | 1/1995 | Fry et al. ....................... 360/53 |
| 6,141,174 A | 10/2000 | Judge et al. .................... 360/76 |
| 6,222,698 B1 | 4/2001 | Barndt et al. .................. 360/76 |
| 6,275,350 B1 | 8/2001 | Barndt ..................... 360/77.12 |
| 6,282,039 B1 * | 8/2001 | Bartlett ........................ 360/48 |
| 6,721,123 B2 | 4/2004 | Sueki et al. .............. 360/77.12 |
| 6,877,128 B2 * | 4/2005 | Boyer et al. ................. 714/771 |
| 7,082,006 B1 | 7/2006 | Smith ....................... 360/77.01 |
| 2002/0124225 A1 * | 9/2002 | Marchant .................... 714/764 |
| 2003/0189782 A1 | 10/2003 | Leonhardt et al. ........ 360/77.01 |
| 2008/0320361 A1 * | 12/2008 | Fukuda et al. .............. 714/755 |

* cited by examiner

*Primary Examiner*—Jason C Olson
(74) *Attorney, Agent, or Firm*—Zilka-Kotab, PC

(57) ABSTRACT

A tape-based data storage system according to one embodiment includes a head having an array of channels for writing a set of data tracks on a magnetic tape; wherein data to be written on the magnetic tape in a given pass of the tape relative to the head is parsed into at least two error correctable sets, wherein each of the error correctable sets is written by a unique subset of the array of channels. A tape-based data storage system according to another embodiment includes a head having an array of channels for reading a set of data tracks on a magnetic tape; wherein data read from the magnetic tape in a given pass of the tape relative to the head includes at least two error correctable sets, wherein each of the error correctable sets is read by a unique subset of the array of channels.

18 Claims, 4 Drawing Sheets

TAPE-BASED DATA STORAGE SYSTEM CAPABLE OF READING AND/OR WRITING MULTIPLE ERROR CORRECTABLE SETS OF DATA

FIELD OF THE INVENTION

The present invention relates to data storage systems, and more particularly, this invention relates to tape-based data storage systems.

BACKGROUND OF THE INVENTION

Magnetic tape-based systems have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape.

When a tape is written to, the span of data just written is the span of the head elements. However, any expansion and contraction of the tape prior to reading results in an expansion or contraction of the space between data tracks and thus the data span. For instance, the width of the tape is known to change with changes in temperature (thermal expansion) and humidity (hygroscopic expansion). In addition, aging of the tape media tends to also change the tape's dimensions over time, adding to these effects for the cases of older tapes used for archiving data. Present tapes typically expand and contract by approximately 1 part in 1000, or 0.1%.

If recorded tracks of information are written in one environment and later read in another environment, the tape expansion or contraction will change the distances between the tracks/channels of the dataset of interest, in comparison with the distances between channels on the recording head that wrote the tracks.

Today's Linear Tape Open (LTO) format utilizes four data-bands across the ½-inch width of tape. At any one time, only one-fourth (¼) of the width of tape is spanning the head transducers. In current Linear Tape Open (LTO) systems, the heads include servo readers that are approximately 3 mm apart. The tape media also includes servo tracks having a spacing of about 3 mm, thereby defining data bands of about 3 mm. A 0.1% expansion over 3 mm results in about 3 micrometers of expansion for a data band. Accordingly, the data tracks themselves must be greater than the reader widths plus 3 micrometers or the readback will suffer from expansion- or contraction-induced misregistration. Reader transducer track widths must be made small enough to account for these dimensional changes in order that the readers are each sufficiently on track for a successful readback process. Accordingly, current tape formats are reaching their limits as far as increasing track density is concerned. To illustrate, consider the following example.

In current tape head products, read sensor width is chosen to be approximately ½ the track width on the tape. Assume that the tracks in a future system are 6 micrometers wide. The sensor is then 3 microns wide. If at the outer tracks, there are 3 micrometers of misregistration, then the readers over these tracks may be riding along the magnetic edges of the written data. Then the reader may come off the track due to uncompensated lateral tape excursions. Accordingly, the track widths (in this example) cannot be made smaller without increased risk of misreads due to tape wobble.

SUMMARY OF THE INVENTION

A tape-based data storage system according to one embodiment includes a head having an array of channels for writing a set of data tracks on a magnetic tape; wherein data to be written on the magnetic tape in a given pass of the tape relative to the head is parsed into at least two error correctable sets, wherein each of the error correctable sets is written by a unique subset of the array of channels.

A tape-based data storage system according to another embodiment includes a head having an array of channels for reading a set of data tracks on a magnetic tape; wherein data read from the magnetic tape in a given pass of the tape relative to the head includes at least two error correctable sets, wherein each of the error correctable sets is read by a unique subset of the array of channels.

A method for reading data from a tape includes attempting to read a plurality of data tracks using an array of readers, the data tracks having at least two error correctable sets of data; verifying an integrity of the reading; and if the integrity of the reading is not verified, attempting to read a plurality of the data tracks using a subset of the array of readers corresponding to one of the error correctable sets of data.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of tape-based storage systems, as well as operation and/or component parts thereof.

In one general embodiment, a tape-based data storage system includes a head having an array of channels for writing a set of data tracks on a magnetic tape. The data to be written on the magnetic tape in a given pass of the tape relative to the head is parsed into at least two error correctable sets, where each of the error correctable sets is written by a unique subset of the array of channels.

In another general embodiment, a tape-based data storage system includes a head having an array of channels for reading a set of data tracks on a magnetic tape. The data read from the magnetic tape in a given pass of the tape relative to the head is in at least two error correctable sets, where each of the error correctable sets is read by a unique subset of the array of channels.

Figure 1:
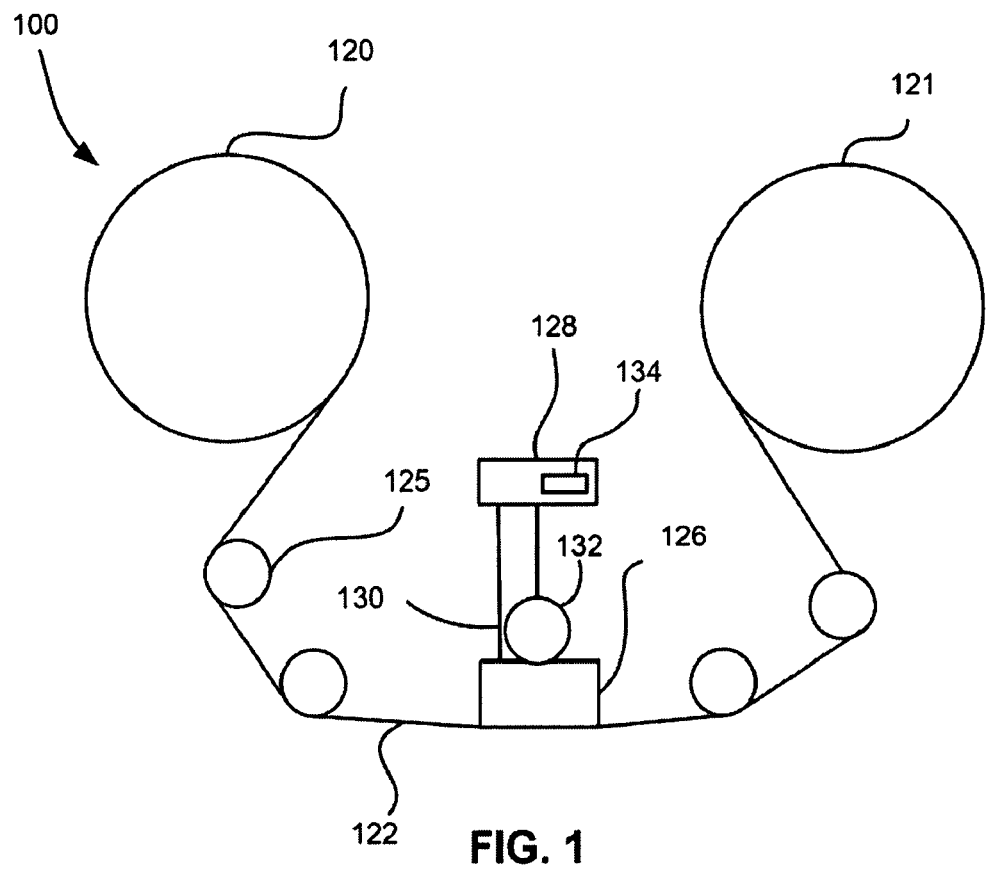
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
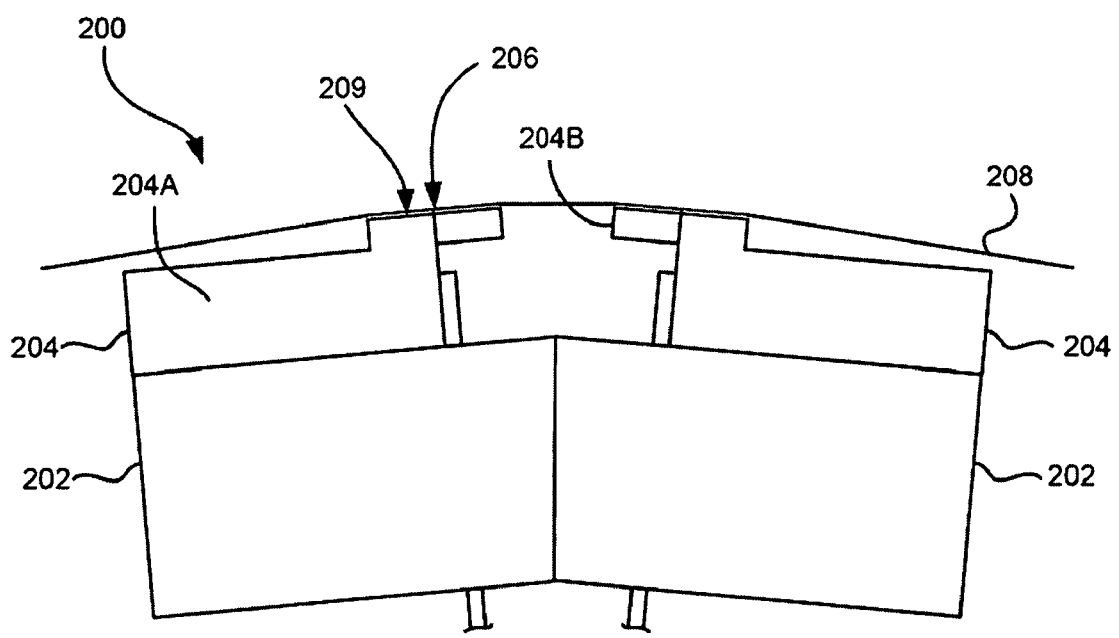
FIG. 2 illustrates a flat-lapped bi-directional, two-module magnetic tape head which may be implemented in the context of the present invention.

By way of example, FIG. 2 illustrates a flat-lapped bi-directional, two-module magnetic tape head 200 which may be implemented in the context of the present invention. As shown, the head includes a pair of bases 202, each equipped with a module 204. The bases are typically "U-beams" that are adhesively coupled together. Each module 204 includes a substrate 204A and a closure 204B with channels comprising readers and/or writers 206 situated therebetween. In use, a tape 208 is moved over the modules 204 along a tape bearing surface 209 in the manner shown for reading and writing data on the tape 208 using the readers and writers 206.

While channels comprising readers and writers may be arranged in a piggyback configuration, the readers and writers may also be arranged in an interleaved configuration. Alternatively, each array of channels may be readers or writers only. Any of these arrays may contain one or more servo readers.

Figure 3:
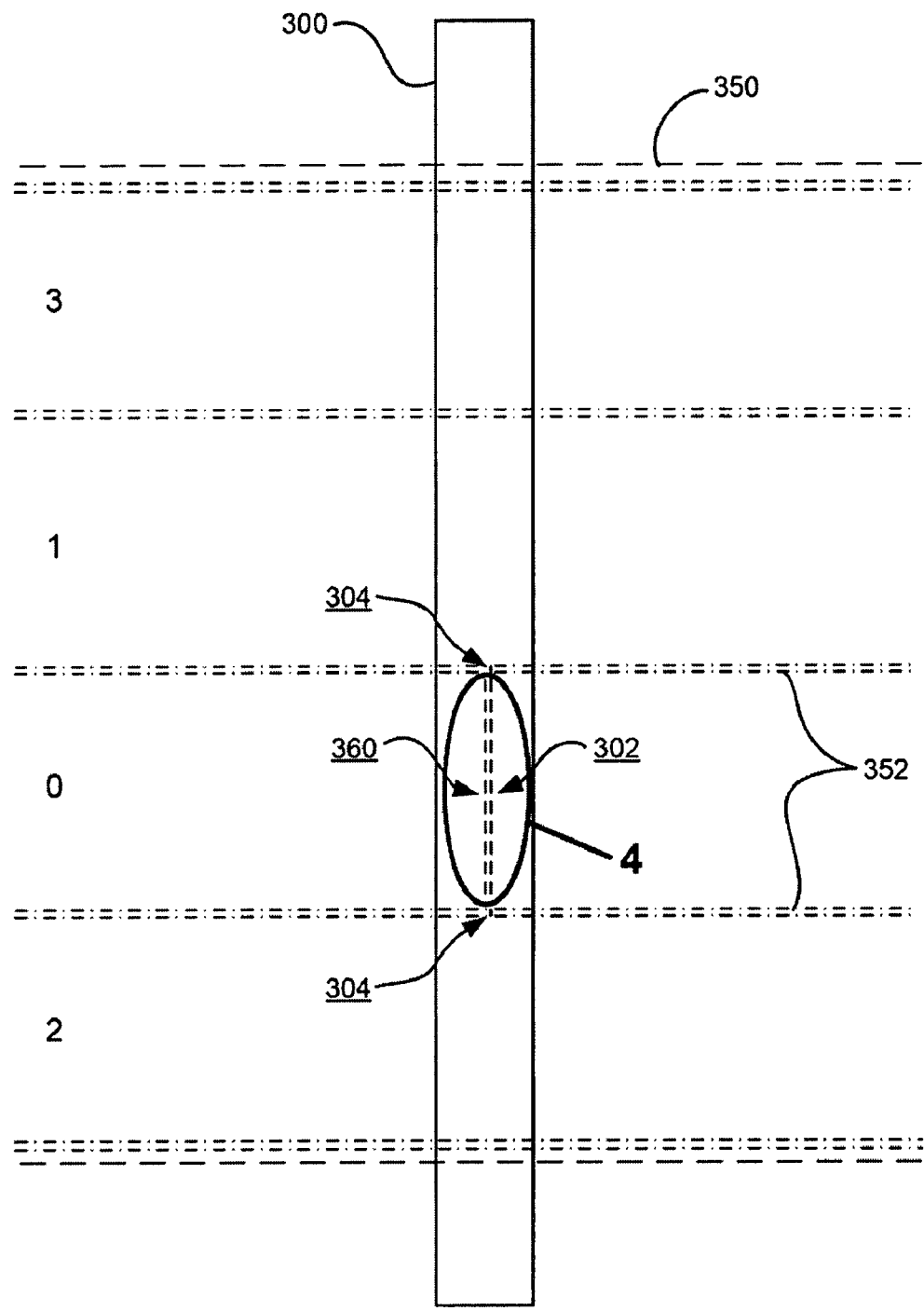
FIG. 3 is a tape bearing surface view of a magnetic tape head according to one embodiment of the present invention.
Figure 4:
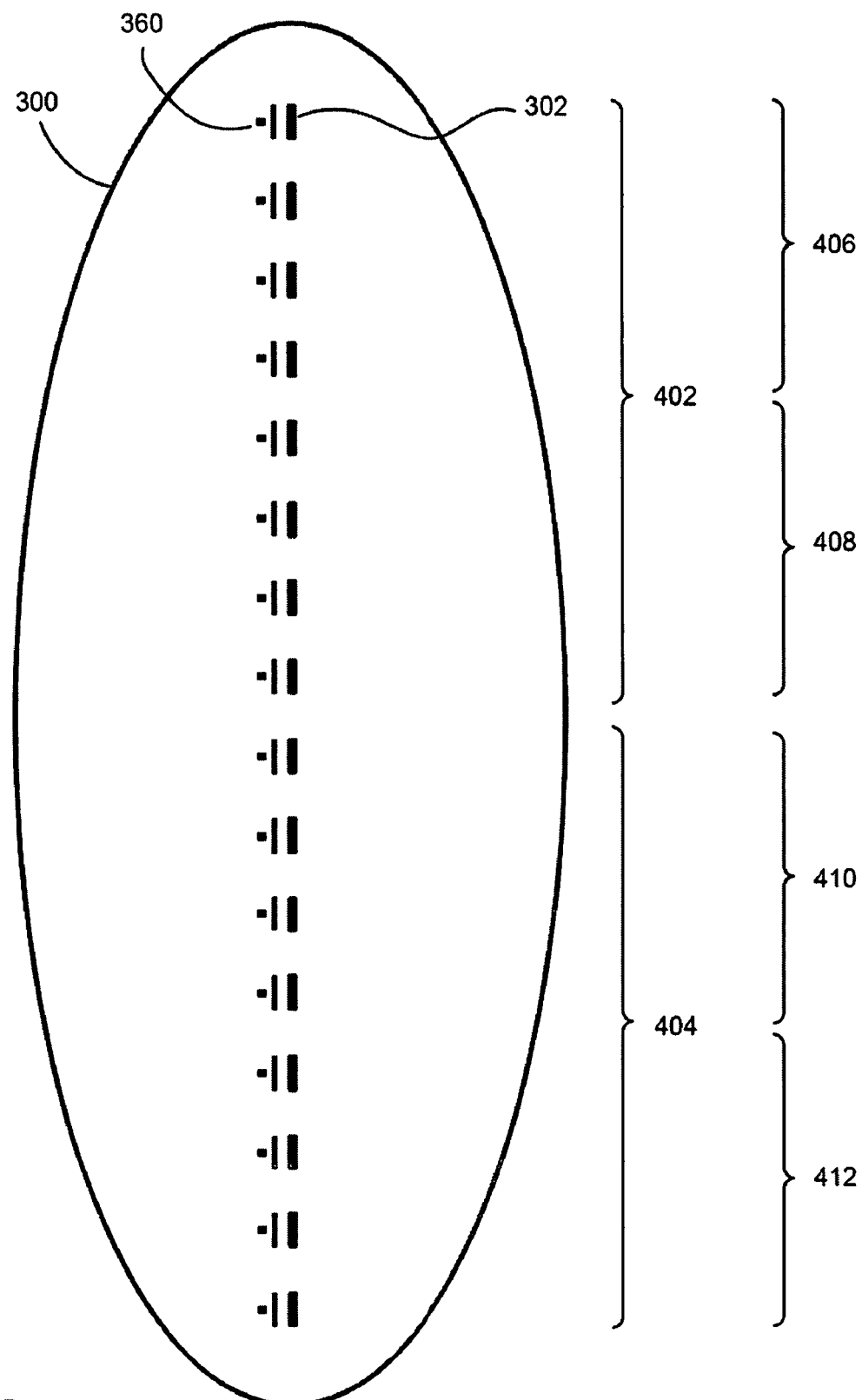
FIG. 4 is a detailed view taken from Circle 4 of FIG. 3 showing the array of transducers according to one embodiment of the present invention.

FIGS. 3 and 4 together illustrate a magnetic tape head 300 according to one embodiment of the present invention. For illustration, a tape 350 is shown in dashed lines. The tape has data bands 0, 1, 2, 3. Servo data 352 is factory-written on the tape 350. In Linear Tape Open (LTO), five servo patterns are written, thereby defining the four data bands 0, 1, 2, 3. Each of the data bands has a plurality of data tracks therein, such as 96 tracks, 128 tracks, etc. Each data band is currently 2.9 mm wide in LTO, but may be any width. Similarly, the servo tracks are approximately 0.19 mm wide, but may be larger or smaller.

The illustrative head 300 shown has an array of 16 readers 302 and an array of 16 writers 360, but may have more (e.g., 24, 32, 40) or less (e.g., 12, 8, etc.). Each reader will typically include a sensor and shields that surround the sensor. The sensors may be any type of sensor, including but not limited to Giant Magnetoresistive (GMR) sensors, Anisotropic Magnetoresistive (AMR) sensors, Magnetic Tunnel Junction (MTJ) sensors, etc. The pitch (center to center spacing) between the readers 302 is preferably uniform across the reader array. Preferably, the tape format is designed such that the head spans an entire data-band of tracks (e.g., ~¼ the tape width for compatibility with LTO 1-4). Two servo bands (tracks) sandwich each data-band.

In operation, the servo readers 304 read servo tracks 352 on the tape 350. A controller analyzes the servo readback signal and positions the head 300 at the appropriate position relative to the tape 350 so that the readers 302 or writers 360 are over the appropriate data tracks on the tape 350. If the tape 350 expands, the outermost readers may be adjacent the inside edges of the data tracks, yet the innermost readers are aligned with about the center of the middle data tracks. The servo controller can determine how to center the innermost readers on the middle data tracks. Particularly, servo readers 304 have a very small track width compared to the servo tracks, and the controller can determine the lateral position of the head 300 relative to the tape 350 based on the servo readback signal.

The data is written to the tape in multiple error-correctable sets of data, with overhead, in such a way as to allow for the recovery of the customer's data, even in the event that a defect is encountered in one or more tracks. Such an error may be caused by reader/track misregistration due to tape lateral expansion or contraction.

Error correction and recovery may be thought of as two distinct operations that are employed at different stages of error processing. Error correction is conventionally implemented using error correction coding (ECC) techniques in which random host data to be placed on a tape medium is encoded in a well-defined structure by introducing data-dependent redundancy information. The presence of data errors is detected when the encoded structure is disturbed. The errors are corrected by making minimal alterations to reestablish the structure. ECC error correction is usually implemented "on-the-fly" as data is processed by the tape drive apparatus. The well-known Reed-Solomon code is one cyclic encoding scheme which has been proposed for ECC error correction. Other encoding schemes are also known in the art.

Error recovery occurs when ECC error correction is unable to correct data errors or when thresholds for allowable correction are exceeded. The error recovery process usually requires stopping the tape and reprocessing a data block in which an error was detected. Typical error recovery procedures include tape refresh operations wherein a tape is wound to its end and brought back to the error recovery point, tape backhitch or "shoeshine" operations wherein a tape is drawn back and forth across the tape head, backward tape read operations, tape tension adjustment operations and tape servo adjustment operations, to name a few.

Non-ECC error correction processes known in the art may also be used.

As noted above, in one preferred embodiment, the data to be written or read on the magnetic tape in a given pass of the tape relative to the head is parsed into at least two error correctable sets, where each of the error correctable sets is written or read by a unique subset of the array of channels of the head.

In one approach, the data is parsed into at least three error correctable sets. In a further approach the data is parsed into at least four error correctable sets. In yet another approach, the data is parsed into at least 5, 6, or more error correctable sets.

In one approach, a preferred number of channels in the error-correctable subsets is preferably, but not necessarily, a power of two, for example, eight (8=2^3), breaking 16-channel formats in 2, 24-channel formats in 3, 32-channel formats in 4, etc., for example.

The controller of the tape drive system may perform the parsing of the data into the at least two error correctable sets prior to a writing operation. Alternatively, or in concert with the controller, the data may be parsed into the at least two error correctable sets prior to being received by the system for a writing operation, e.g., by a host or peripheral system.

Similarly, during a reading operation, the controller may assemble the data from the at least two error correctable sets into a single data stream or multiple data streams, or the two or more error correctable sets may be output by the system in one or more streams with or without processing by the controller.

Preferably, the channels in each subset are physically grouped together relative to the other channels to minimize the effects of tape lateral expansion or contraction during readback of a particular subset. In a reader-only, writer-only, piggyback configuration, etc., this may mean that the channels are all adjacent. In an interleaved configuration, this may mean that several readers in a row are grouped even though writers are present between them.

In a normal mode of operation, all of the channels for writing and/or reading the set of data tracks are active. However, in one mode of operation, if an error is detected during the reading (such as misregistration due to tape lateral expansion or contraction), only some of the subsets of the array may be used for reading the data tracks (associated with that subset) and other subset(s) are not. For instance, one subset may read data tracks while all other subsets do not read. In another approach, some subsets may read data tracks while other subsets do not read. Servo information may be used to align the active channel subset with the desired data tracks, thereby effectively reducing the effects of tape lateral expansion or contraction by reading a smaller subset of data tracks.

To place the broad, general embodiments of the present invention in a context, consider the following nonlimiting example. In LTO4, 16 channels/tracks are written at a time, incrementing the tracking for multiple (7 each) forward and reverse passes of the tape relative to the head to fill each data-band with 224 tracks (for a total of 896 tracks of customer data across the ½-inch tape). The 16 channels on the head roughly span each entire data band (i.e., roughly ¼ the tape width in LTO 1-4).

Assume also that the head has 16 channels, i.e., can read or write 16 data tracks during a given unidirectional pass of the tape over the head. User data is distributed across the 16 channels (i.e., substantially across the width of the data-band), providing multiple error-correctable sets of data, with overhead, in such a way as to allow for the recovery of the customer's data, even in the event that a defect is encountered in one or more tracks.

In one approach, each error-correctable set of data is associated with a subset of the number of active channels, where active channels refer to the maximum number of operating readers or writers in an array, typically excluding servo readers or servo writers.

Referring again to FIG. 4, in one example, instead of using all 16 channels for a single error-correctable set of data, two sets 402, 404 of 8 adjacent channels, each, could be used to read and/or write two individual error-correctable sets of data on the data tracks. In this way, the maximum span of concern for tape lateral expansion or contraction effects would be only ½ the span described above (or ⅛th the tape width, in this example), and the margin for accounting for the tape lateral expansion or contraction effect in the reader track width would be reduced (by 2× in this example), effectively increasing the allowed reader track width, accordingly. This provides all the associated benefits of a larger reader track width, for example, larger signal-to-noise ratio, smaller error rates, larger signal amplitude, etc.). In another example, four sets 406, 408, 410, 412 of 4 adjacent channels, each, could be used to read and/or write the data tracks.

In another approach, for a given reader track width, more tracks can be placed in each data-band and across the tape, increasing the tape's capacity. For example, the number of channels in a future format could be increased to 32, while making the number of (preferably adjacent) channels in the error-correctable set 16 (i.e., two error-correctable data streams flow simultaneously), or decreasing the number of channels in each error-correctable set to 8 (i.e., four independent simultaneous error-correctable streams). Here, the effect of tape lateral expansion or contraction would be reduced by 2× or 4×, respectively, in comparison with the case where a single error correctable set of data was written or read simultaneously on all 32 channels. One advantage of this approach over miniaturization (i.e., further span-reduction on the head, but using only a single error correctable data set) is that the requirement for head miniaturization can be reduced or eliminated and/or utilized for increasing the number of active channels (for data rate increase and/or tape speed reduction), without the otherwise significant impact on the factor of reduction in the head element (transducer) pitch. In the 32_8 example above, a reduction of 4× in tape lateral expansion or contraction effect is achieved while increasing the number of channels by 2×, using a head element pitch reduction of only 2×, instead of 8×[=2×*4×].

Figure 5:
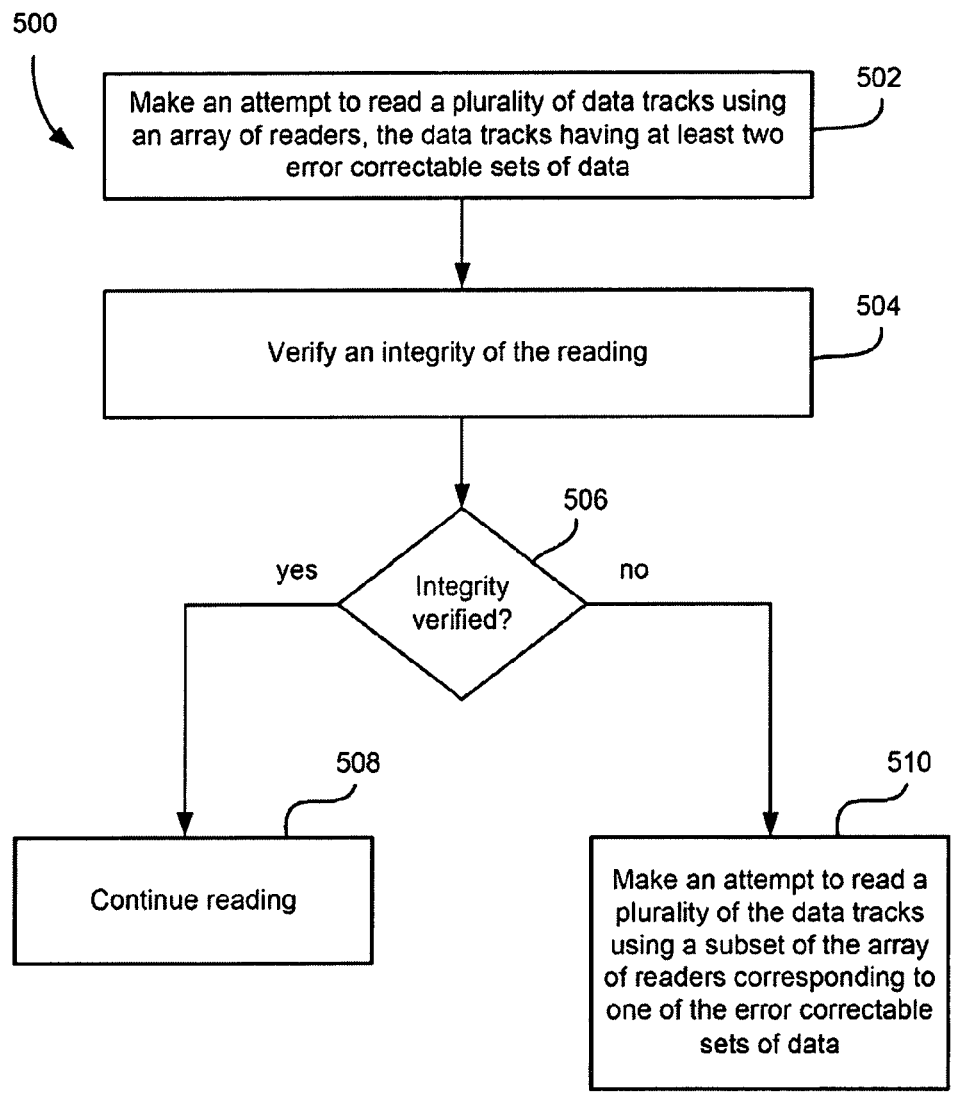
FIG. 5 illustrates a method for reading data from a tape according to one general embodiment.

FIG. 5 illustrates a method 500 for reading data from a tape according to one general embodiment. In operation 502, an attempt is made to read a plurality of data tracks using an array of readers, the data tracks having at least two error correctable sets of data. Such attempt preferably includes actual reading of the data, but may also include mere sampling for verification purposes. In operation 504, an integrity of the reading is verified using any standard or known technique, such as cyclical redundancy checking (CRC), etc. At decision 506, a determination is made as to whether the integrity of the reading is verified. If the integrity of the reading is verified, e.g., the error rate during reading is within an acceptable level, the reading continues using the array of readers in operation 508. If the integrity of the reading is not verified, for example due to detecting an off-track condition of at least one of the readers relative to the data tracks being read, an attempt is made in operation 510 to read a plurality of the data tracks using a subset of the array of readers corresponding to one of the error correctable sets of data. Again, the subset may be any portion of the reader array, such as one half the readers, one third of the readers, one fourth of the readers, etc.

In one embodiment, the subset may be further divided into sub-subsets. Accordingly, a process similar to that of FIG. 5 may be used to determine whether to read the data using only a sub-subset of the readers in the array.

In one illustrative embodiment using a head as described above (e.g., the 32 channel head with 8 subsets example) with a 4-data-band tape, data sets in the format are broken into four 8-channel pieces (4×8=32) as the fundamental error-correctable unit. Each set of 8 adjacent channels on the head spans, in this case, one-quarter the data-band (one-sixteenth the tape width, in this example). In normal operation, 32 channels of data are written and read, using these fundamental units.

Under adverse conditions, such as environmental change and/or aging of the media, the drive may detect that off-track conditions occur (e.g., by detecting misregistration between one or more readers and the data tracks), with data recovery difficulties. An error-recovery procedure is invoked in order to recover the 8-channel pieces of data, perhaps one at a time (8 channels at a time, which is the smallest error-correctable set of channels, in this example), and later reassembled into the user's data. Each 8-channel 'piece' of data could be read separately, for example by stepping the head to be on-track for those channels, then stepping from 8-channel piece to 8-channel piece (using positioning algorithms to independently optimize the tracking at each piece, as measured from one or more various quality metrics) until all the pieces of the data are recovered and reconstructed. In this way, the data are recovered without difficulty for the user, while the tape format, head, and drive designs and performances are all enhanced (increased track density on tape and/or increased head element pitch, increased reader track width and thereby increased signal to noise ratio [for a given track density], compared with other strategies) for the otherwise standard user operation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape-based data storage system, comprising:
   a head having an array of channels for concurrently writing a set of data tracks on a magnetic tape;
   wherein data to be written on the magnetic tape in a given pass of the tape relative to the head is parsed into at least two error correctable sets,
   wherein each of the error correctable sets is written by a unique subset of the array of channels,
   wherein at least one of the subsets of the array of channels includes two or more channels.

2. A system as recited in claim 1, wherein the data is parsed into at least three error correctable sets.

3. A system as recited in claim 1, wherein wherein during readback, in a normal mode of operation, several of the channels for reading the set of data tracks are active, wherein if an error is detected during the reading, of the subsets of the array is used for reading the data tracks and any other subsets are not.

4. A system as recited in claim 1 further comprising a controller for parsing the data into the at least two error correctable sets.

5. A system as recited in claim 1, wherein the data is parsed into the at least two error correctable sets prior to being received by the system.

6. A system as recited in claim 1, wherein the channels in each subset are physically grouped together relative to the other channels.

7. A tape-based data storage system, comprising:
   a head having an array of channels for reading a set of data tracks on a magnetic tape;
   wherein data read from the magnetic tape in a given pass of the tape relative to the head includes at least two error correctable sets,
   wherein each of the error correctable sets is read by a unique subset of the array of channels,
   wherein, in a normal mode of operation, several of the channels for reading the set of data tracks are active, wherein if an error is detected during the reading, at least one of the subsets of the array is used for reading the data tracks and any other subsets are not.

8. A system as recited in claim 7, wherein the data includes at least three error correctable sets.

9. A system as recited in claim 7, wherein the data includes at least four error correctable sets.

10. A system as recited in claim 7, further comprising a controller for assembling the data from the at least two error correctable sets into a single data stream.

11. A system as recited in claim 7, wherein the channels in each subset are physically grouped together relative to the other channels.

12. A system as recited in claim 7, wherein, in a normal mode of operation, all of the channels for reading the set of data tracks are active, wherein if an error is detected during the reading, one of the subsets of the array is used for reading the data tracks and the other subset or subsets are not.

13. A system as recited in claim 12, wherein the error relates to misregistration of at least one of the channels relative to the data tracks being read, the misregistration being caused by tape lateral expansion or contraction.

14. A system as recited in claim 7, wherein, in a normal mode of operation, all of the channels for reading the set of data tracks are active, wherein if an error is detected during the reading, at least two of the subsets of the array are used for reading the data tracks and any other subsets are not.

15. A method for reading data from a tape, the method comprising:
   attempting to read a plurality of data tracks using an array of readers, the data tracks having at least two error correctable sets of data;
   attempting to verify an integrity of the reading; and
   if the integrity of the reading is not verified, attempting to read a plurality of the data tracks using a subset of the array of readers corresponding to one of the error correctable sets of data, wherein the subset of the array of readers includes at least two of the readers.

16. A method as recited in claim 15, further comprising determining that the integrity of the reading is not verified due to an off-track condition of at least one of the readers relative to the data tracks being read.

17. A method as recited in claim 15, wherein the subset includes about one half the readers in the array.

18. A method as recited in claim 15, wherein the subset includes about one quarter of the readers in the array.

* * * * *